United States Patent
Hirota et al.

(10) Patent No.: US 9,534,663 B2
(45) Date of Patent: Jan. 3, 2017

(54) TRANSMISSION DEVICE

(71) Applicant: GKN Driveline Japan Ltd, Tochigi (JP)

(72) Inventors: Isao Hirota, Kanuma (JP); Atsushi Tamura, Utsunomiya (JP); Noboru Uchida, Utsunomiya (JP); Takahiro Nagaoka, Tochigi (JP); Masashi Aikawa, Tochigi (JP)

(73) Assignee: GKN Driveline Japan Ltd., Tochigi (JP)

( * ) Notice: Subject to any disclaimer, the term of this patent is extended or adjusted under 35 U.S.C. 154(b) by 0 days.

(21) Appl. No.: 15/140,814

(22) Filed: Apr. 28, 2016

(65) Prior Publication Data
US 2016/0238107 A1 Aug. 18, 2016

Related U.S. Application Data

(63) Continuation of application No. PCT/JP2014/079649, filed on Nov. 7, 2014.

(30) Foreign Application Priority Data

Nov. 8, 2013 (JP) .................. 2013-232087

(51) Int. Cl.
F16H 1/32 (2006.01)
F16H 21/14 (2006.01)
(Continued)

(52) U.S. Cl.
CPC ............. *F16H 1/32* (2013.01); *F16D 13/54* (2013.01); *F16D 28/00* (2013.01); *F16H 21/14* (2013.01);
(Continued)

(58) Field of Classification Search
None
See application file for complete search history.

(56) References Cited

U.S. PATENT DOCUMENTS 3,561,292 A * 2/1971 Lorence ................... F16H 3/70
                                                    475/173
6,951,521 B2 * 10/2005 Hakui ................ F16H 63/3043
                                                    192/20

(Continued)

FOREIGN PATENT DOCUMENTS

JP    2004316893 A    11/2004
JP    2013204701 A    10/2013

OTHER PUBLICATIONS

International Search Report and Written Opinion for PCT/JP2014/079649 dated Feb. 10, 2015 (6 pages; with English translation).

*Primary Examiner* — Justin Holmes
(74) *Attorney, Agent, or Firm* — Bejin Bieneman PLC

(57) ABSTRACT

A transmission device is comprised of a clutch disconnectably and drivingly coupling a first rotary member with a second rotary member; a motor including a rotor rotatable about an axis; an input member coupled with the rotor and rotatable about the axis, the input member including an eccentric shaft eccentric relative to the axis; a fixed member immovable about the axis; an intermediate member fitting with the eccentric shaft to make an eccentric motion and meshing with the fixed member to make a rotary motion about the eccentric shaft; an output member rotatable about the axis and fitting with and following the intermediate member; and a cam mechanism intervening between the output member and the clutch to convert a rotary motion of the output member into a motion in a direction along the axis to press the clutch.

7 Claims, 6 Drawing Sheets

(51) Int. Cl.
    *F16D 28/00*     (2006.01)
    *F16D 13/54*     (2006.01)
    *F16D 23/12*     (2006.01)
    *B60K 17/02*     (2006.01)
    *B60K 17/348*     (2006.01)
    *F16D 13/52*     (2006.01)

(52) U.S. Cl.
    CPC .............. *B60K 17/02* (2013.01); *B60K 17/348* (2013.01); *F16D 13/52* (2013.01); *F16D 2023/123* (2013.01)

(56) References Cited

U.S. PATENT DOCUMENTS

| | | | |
|---|---|---|---|
| 2006/0014601 A1* | 1/2006 | Kelley, Jr. | F16H 48/08 475/231 |
| 2008/0149451 A1* | 6/2008 | Pritchard | F16D 28/00 192/84.6 |
| 2009/0017982 A1* | 1/2009 | Gasch | B60K 17/35 476/8 |
| 2011/0036677 A1* | 2/2011 | Kriebernegg | F16D 13/52 192/70.12 |

\* cited by examiner

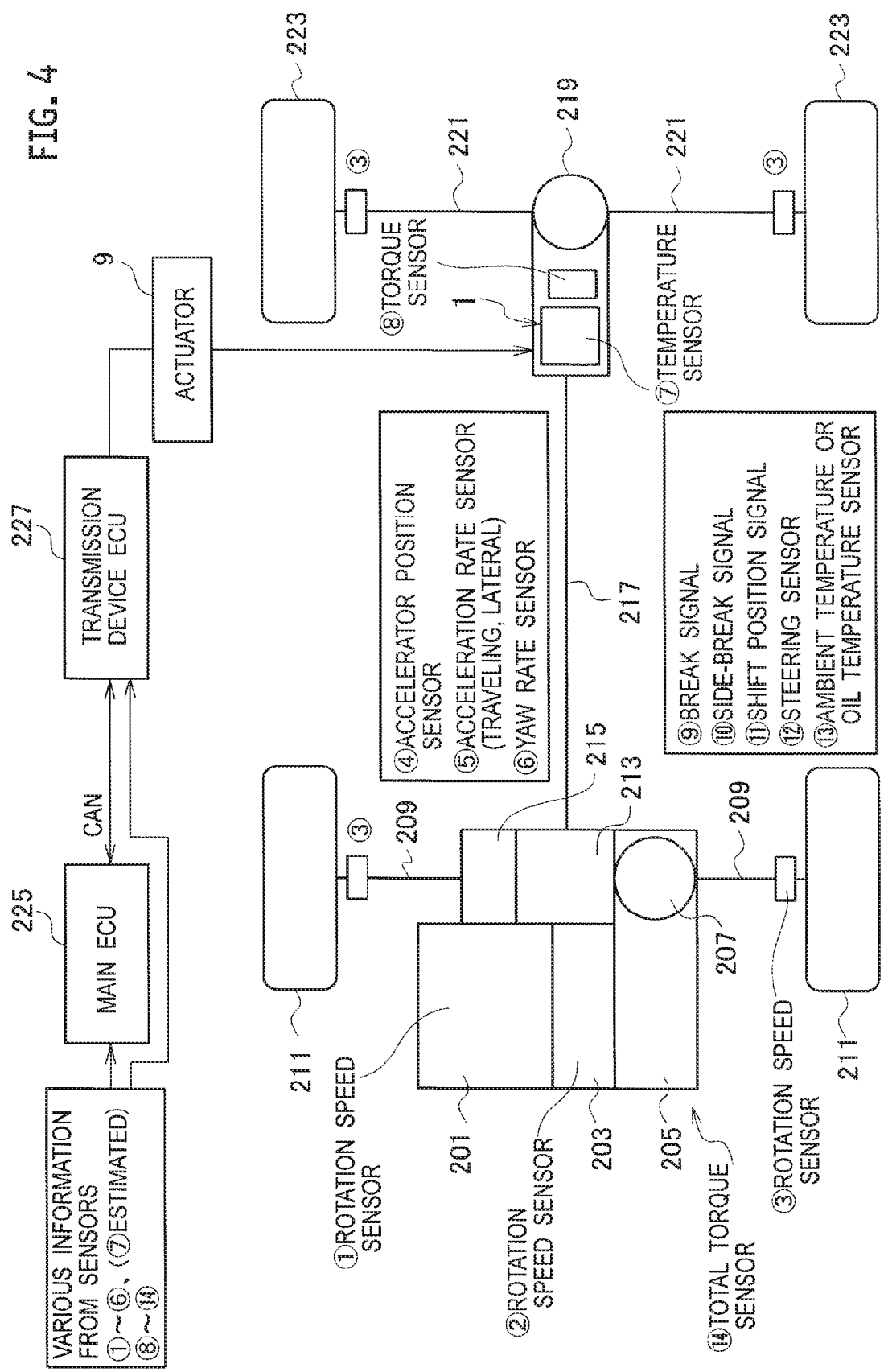

TRANSMISSION DEVICE

CROSS-REFERENCE TO RELATED APPLICATIONS

This application is a continuation Application of PCT International Application No. PCT/JP2014/079649 (filed Nov. 7, 2014), which is in turn based upon and claims the benefit of priority from Japanese Patent Application No. 2013-232087 (filed Nov. 8, 2013), the entire contents of which are incorporated herein by reference.

BACKGROUND

In a part-time four-wheel-drive vehicle, for example, only front axles are constantly connected with the transmission and rear axles are sometimes connected therewith. For the purpose of establishing connection of the rear axles automatically or in accordance with operation by a driver, a transmission device containing a clutch may be used, which may intervene between a propeller shaft and a rear differential for example.

In this device, what should be selected as an actuator for coupling the clutch is a technical problem. While torque sufficient for running the vehicle acts on the propeller shaft, the actuator device must overcome this torque to establish connection of the clutch. Even where a hydraulic device or an electric motor is used, the device used must output considerably great power when the power alone must establish connection of the clutch or retain the connection. The actuator inevitably requires a great scale and great energy consumption.

Japanese Patent Application Laid-open No. 2004-316893 discloses a related art.

SUMMARY

The disclosure herein relates to a transmission device for interruptibly transmitting torque between two rotary members, e.g., to a transmission device used in combination with a differential device for distributing torque to axles of a vehicle in order to control torque transmission from a propeller shaft to the differential device.

In the related art described above, a reduction gear mechanism using a planetary gear is combined with a motor and a cam mechanism. In this device, the reduction gear mechanism reduces speed of rotation (in other words, multiplies force) by the motor, and the cam mechanism converts it into axial motion and then applies the multiplied pressure force to the clutch. According to this art, even a motor having relatively small power can apply sufficiently strong pressure force to the clutch.

A reduction gear mechanism with a planetary gear would not, however, create a very great reduction ratio and therefore the ratio of force multiplication is thus limited. If a complex gear system is used in order to create a greater reduction ratio, the system in itself would be oversized. This is contrary to its original intent to downsize the actuator.

The device described below has been devised in view of the aforementioned problems. According to an aspect, a transmission device for interruptibly transmitting torque between a first rotary member and a second rotary member respectively rotatable about an axis is comprised of a clutch disconnectably and drivingly coupling the first rotary member with the second rotary member; a motor including a rotor rotatable about the axis; an input member coupled with the rotor and rotatable about the axis, the input member including an eccentric shaft eccentric relative to the axis; a fixed member immovable about the axis; an intermediate member fitting with the eccentric shaft to make an eccentric motion and meshing with the fixed member to make a rotary motion about the eccentric shaft; an output member rotatable about the axis and fitting with and following the intermediate member; and a cam mechanism intervening between the output member and the clutch to convert a rotary motion of the output member into a motion in a direction along the axis to press the clutch.

BRIEF DESCRIPTION OF THE DRAWINGS

FIG. 4 is a block diagram of a vehicle according to the present example.

DESCRIPTION OF EMBODIMENTS

Figure 1:
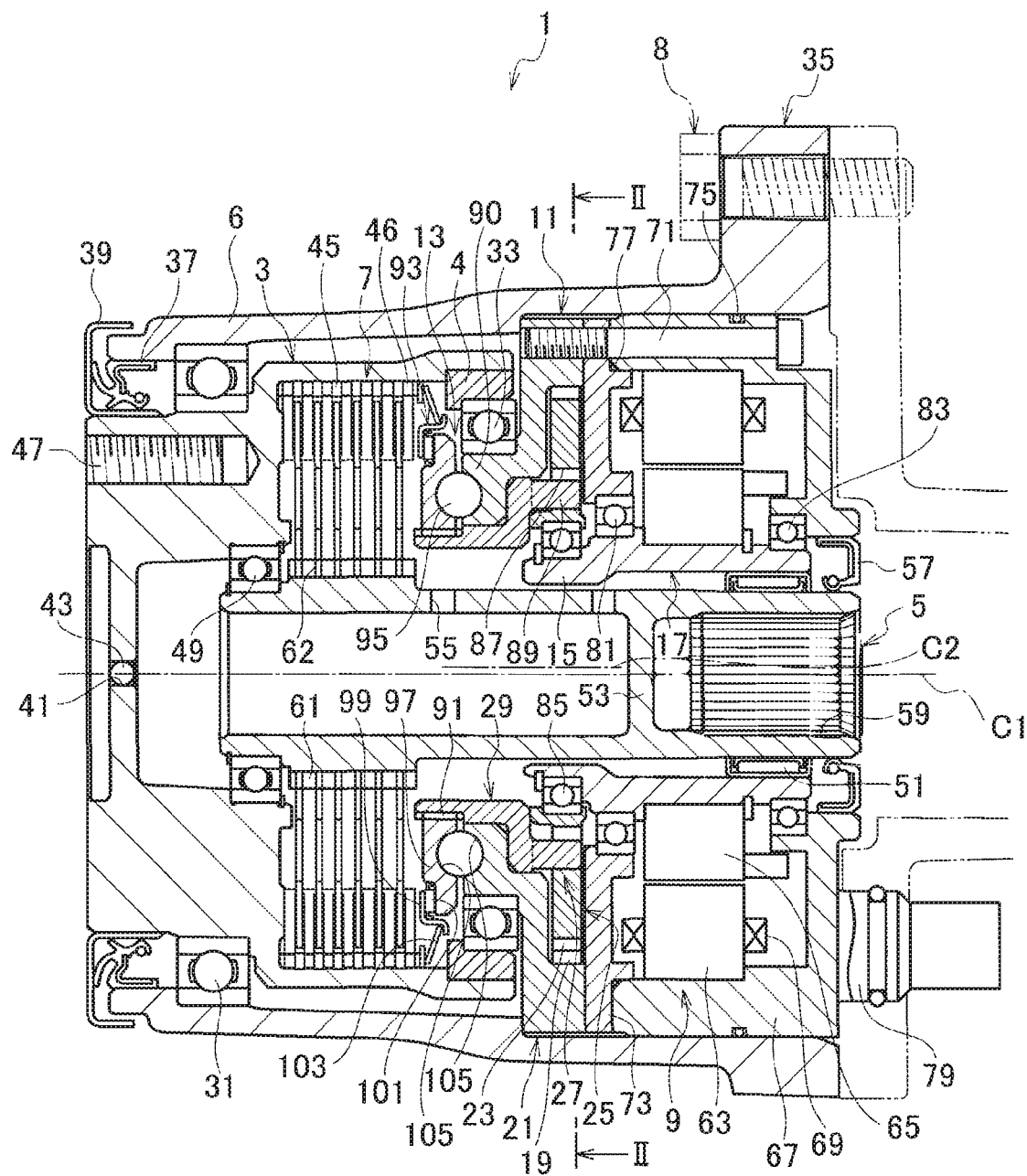
FIG. 1 is a sectional elevational view of an example transmission device.

Exemplary embodiments will be described hereinafter with reference to FIGS. 1 through 8.

Referring to FIG. 4, a vehicle is, for example, comprised of a drive force source including an engine 201 and/or a motor/generator 203, a gearbox 205 for changing speed of rotation by the drive force source, a front differential 207 for distributing transmitted torque to right and left front axles 209, and front wheels 211 respectively combined therewith. In a four-wheel vehicle, part of the torque from the drive force source is taken by a power takeoff 213, transmitted via a propeller shaft 217 to a rear differential 219, and distributed to right and left rear axles 221, thereby driving rear wheels 223.

The motor/generator 203 receives electric power from a battery and, without or along with the engine 201, supplies torque to the vehicle. The motor/generator 203, further, depending on remaining charge in the battery, converts part of the torque provided by the engine 201 into electric power to charge the battery. A generator 215 is possibly added to the vehicle, which at a time of deceleration regenerates energy from the deceleration.

In the present example, in order to execute part-time four-wheel-drive operation, a transmission device 1 intervenes between the propeller shaft 217 and the rear differential 219 to control torque transmission therebetween. When a clutch 7 included in the transmission device 1 is connected, the transmission device 1 transmits torque from the propeller shaft 217 to the rear differential 219 and this torque drives the rear wheels 223 to run the vehicle in a four-wheel-drive mode. When the clutch 7 is disengaged, the torque is not transmitted to the rear differential 219 and therefore drives only the front wheels 211 to run the vehicle in a two-wheel-drive mode.

To control respective devices, a plurality of electric control units (ECUs) can be used. In the example shown in FIG. 4, the vehicle is comprised of a main ECU 225 and a transmission device ECU 227. For the convenience of explanation, the main ECU 225 will be treated as a single unit hereinafter but may be a group of plural ECUs, each of which can independently control the engine, the transmission, the motor/generator, breaks or such. Further the ECUs may exchange information with the other by means of so-called CAN communication.

The main ECU 225 or the transmission ECU 227 is connected to a plurality of sensors to receive signals therefrom. The sensors detect, for example, rotation speed of the engine 201, rotation speed of the motor/generator 203, rotation speed of each wheel, an accelerator position, acceleration rates in the traveling direction and the lateral direction, a yaw rate, temperature in the transmission device 1, torque of an output shaft, a break position, a side-break position, a shift position in the gearbox, a rudder angle of the steering, oil temperatures at respective parts, and an ambient temperature, thereby collecting information about various parts in the vehicle. The respective ECUs in turn select collected information, execute calculation, and compare results with recorded charts to output control information to the respective parts in the vehicle and control respective devices.

The transmission device ECU 227 receives the output from the temperature sensor and estimates a temperature in the transmission device 1. The transmission device 1 is further comprised of a torque sensor consisting of a resolver detecting torque transmitted to the rear differential 219 and the transmission device ECU 227 is further connected to this torque sensor to receive its signals. The transmission device ECU 227 is connected to respective elements in the transmission device 1, such as a motor (actuator) 9, a reduction mechanism 11, and a cam mechanism 13 for example, to collect information therefrom, and further controls them to control operation of the clutch 7.

Figure 5:
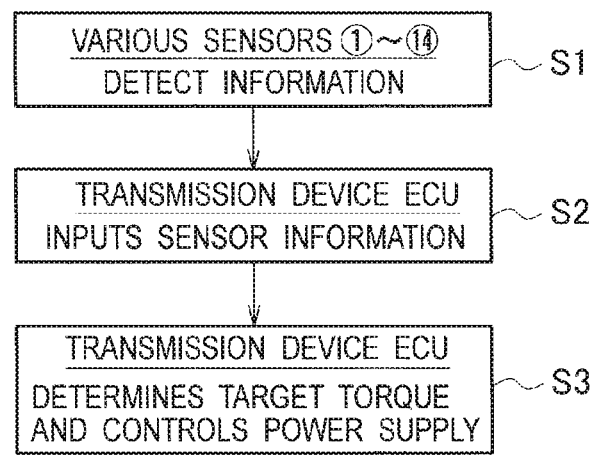
FIG. 5 is a flowchart illustrating operation of respective ECUs.

The main ECU 225 and the transmission device ECU 227, in accordance with the flowchart shown in FIG. 5, detect respective status of respective parts through the sensors (S1), and input detected signals to the transmission device ECU 227 (S2). The transmission device ECU 227 determines target torque that the rear differential 219 is made to transmit and controls power supply to the motor 9 according to the determined target torque (S3).

Figure 6:
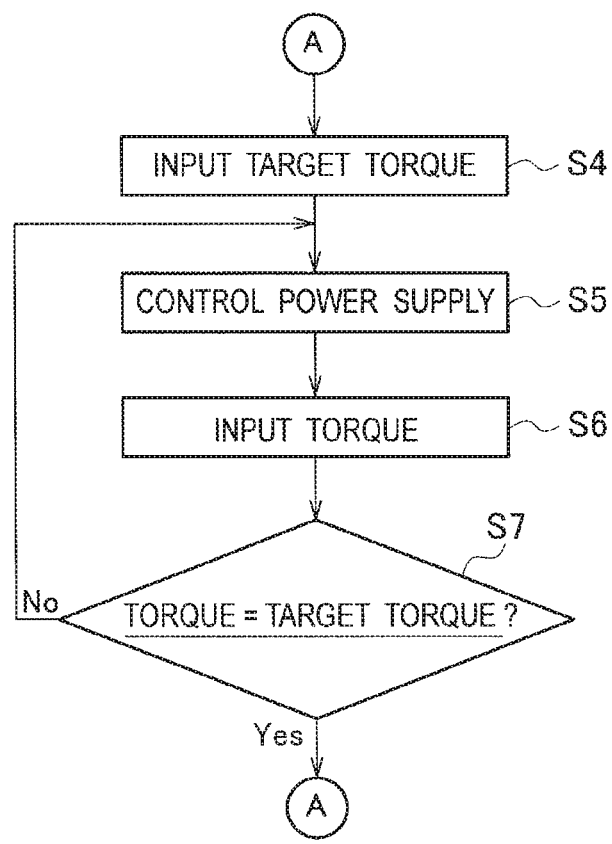
FIG. 6 is a flowchart illustrating a process for controlling torque according to the present example.

The transmission device ECU 227 subsequently, in accordance with the flowchart shown in FIG. 6, determines whether the torque input from the torque sensor matches up with the target torque (S7), and then sends control back to S4 if they match up, or modifies power supply to the motor 9 until they match up if they do not, so as to control operation of the clutch 7 (S5).

Figure 7:
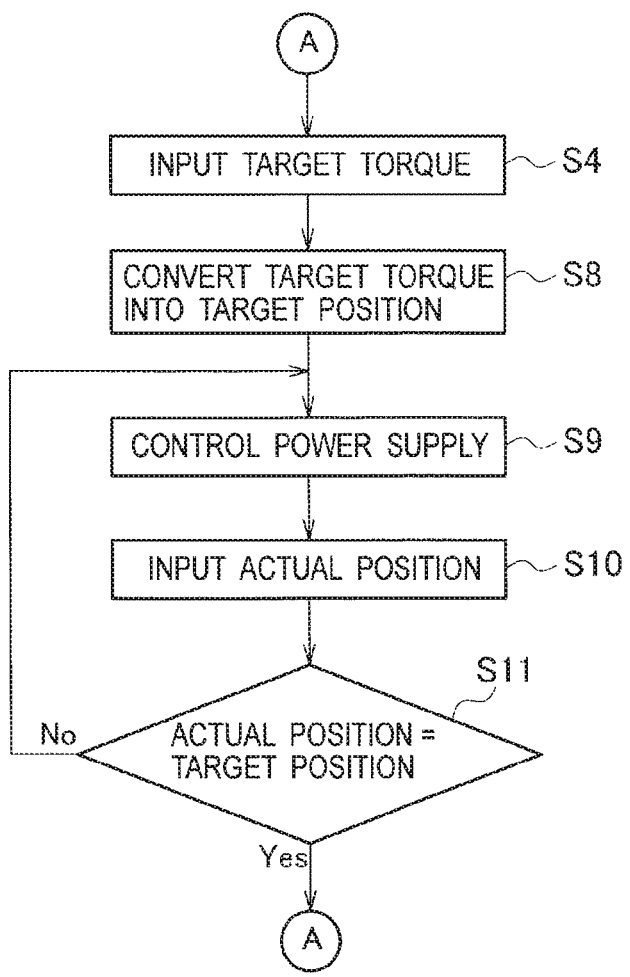
FIG. 7 is a flowchart illustrating a process for controlling torque according to another example.

Alternatively, the main ECU 225 and the transmission ECU 227 may, in accordance with the flowchart shown in FIG. 7, execute control based on a target position instead of the target torque. The rotational angle of the motor 9 may be selected as the target position. More specifically, a target torque is input to the ECU 227 (S4), a target position is calculated from the target torque (S8), an actual position (rotational angle) of the motor 9 is detected (S10), and operation of the clutch 7 is controlled by modifying power supply to the motor 9 until the actual position matches up with the target position (S11).

Under the control as described above executed by the main ECU 225 and the transmission device ECU 227, the transmission device 1 of the present example can control torque distribution to the front and rear axles. This control allows selection of drive modes depending on conditions of roads and conditions of vehicle's motion and control of torque distribution, thereby realizing stable and improvement in fuel consumption.

Referring mainly to FIG. 1, details of the transmission device 1 will be described. The transmission device 1 interruptibly transmits torque between a first rotary member (such as the propeller shaft 217) and a second rotary member (such as a gear for transmitting torque to the rear differential 219), both of which are rotatable about an axis C1.

The transmission device 1 is in general comprised of a clutch 7, a motor 9, a reduction mechanism 11, and a cam mechanism 13, and the whole of them is housed and used in a casing 6. The motor 9 is a source for exerting pressure to the clutch 7. Rotation of the motor 9 is reduced in speed (in other words, its force is multiplied) by the reduction mechanism 11 and the resultant rotary motion is converted into an axial motion by the cam mechanism 13, so that the multiplied pressure force acts on the clutch 7.

The clutch 7 is comprised of a clutch drum 3 to be combined with the first rotary member and a clutch hub 5 to be combined with the second rotary member, which are coaxial and both rotatable about the axis C1.

The clutch hub 5, at least in part, is in the clutch drum 3, and clutch plates elongated from both of them overlap with each other to form a multiplate clutch. A clutch of any other type, such as a cone clutch, may be used instead of the multiplate clutch.

In a case of the multiplate clutch, preferably formed on the internal periphery of the clutch drum 3, are splines 45, which mesh with the plurality of outer clutch plates 46. Further preferably formed on the external periphery of the clutch hub 5 are splines 61, which mesh with the plurality of inner clutch plates 62. The outer clutch plates 46 and the inner clutch plates 62 are arranged alternately and, when the pressure force acts thereon in the axial direction, create frictional force, thereby transmitting torque therebetween.

The clutch drum 3 is extended in the axial direction (leftward in the referred drawing) from the part where the clutch hub 5 overlaps therewith, and is exposed to the opening of the casing 6, thereby serving for coupling with the propeller shaft 217 or such. For coupling, the extended part is made thicker in its radial direction and has a plurality of tapped holes 47.

The clutch drum 3 is, possibly at this extended part, rotatably supported by a bearing 31 supported on an inner periphery of the casing 6. The clutch drum 3 is further supported at a proper position axially apart from the bearing 31 by another bearing 33 in a rotatable manner. The bearing 33 may be supported by an inner periphery of the casing 6, but can be supported by the reduction mechanism 11, in particular its fixed member 21. This structure is advantageous not only in space saving but also in facility for axis alignment between the clutch 7 and the reduction mechanism 11. Between the bearing 33 and the clutch drum 3 or the reduction mechanism 11, meanwhile, an adapter 4 may be interposed.

The clutch hub 5 is extended in a direction opposite to the clutch drum 3 to form a shaft, and an end thereof is exposed to an opening of the casing 6. This opening is opposite to the opening where the clutch drum 3 is exposed. This end is served for coupling with the rear differential 219 or such and has a structure for coupling, such as splines 59, on its internal periphery for example. The clutch hub 5 can have a hollow cylindrical shape, which contributes to weight reduction.

The clutch hub 5 is, preferably around its end, rotatably supported by a bearing 49 supported on the inner periphery of the clutch drum 3 and, around its opposite end, supported by the reduction mechanism 11, in particular by the input member 17 thereof. Interposed therein is a needle bearing 51 for example. This structure is also advantageous not only in space saving but also for providing axis alignment between the clutch 7 and the reduction mechanism 11. Particularly if the clutch drum 3 and the clutch hub 5 are both supported by the reduction mechanism 11, this makes it very easy to axially align these three components.

The motor 9 is comprised of a stator 63, a rotor 65 rotating relative to the stator 63, and a coil 69 electromagnetically driving the rotor 65. Wiring of the coil 69 is led out via a connector 79 and is then connected to the power source. Further this wiring is also connected to the transmission device ECU 227 and is subject to its control so that rotation of the rotor 65 is controlled.

The whole of the motor 9 is housed in a motor housing 67 and a cover body 73 covering it, and the stator 63 is fixedly supported thereby. These are so structured such that any of them are coaxial around the axis C1 but this structure may be modified into a structure where at least the rotor 65 is coaxial around and rotatable about the axis C1. The motor housing 67 is pressed into the casing 6 and thus the whole of the motor 9 is fixed to the casing 6.

The reduction mechanism 11 is in general comprised of an input member 17 rotatable about the axis C1, a fixed member 21 immovable about the axis C1, an intermediate member 25 rotatably fitting in the fixed member 21, and an output member 29 engaging with the intermediate member 25. The input member 17 is coupled with the rotor 65 to receive its rotation and the output member 29 outputs rotation reduced in speed to the cam mechanism 13.

Figure 2:
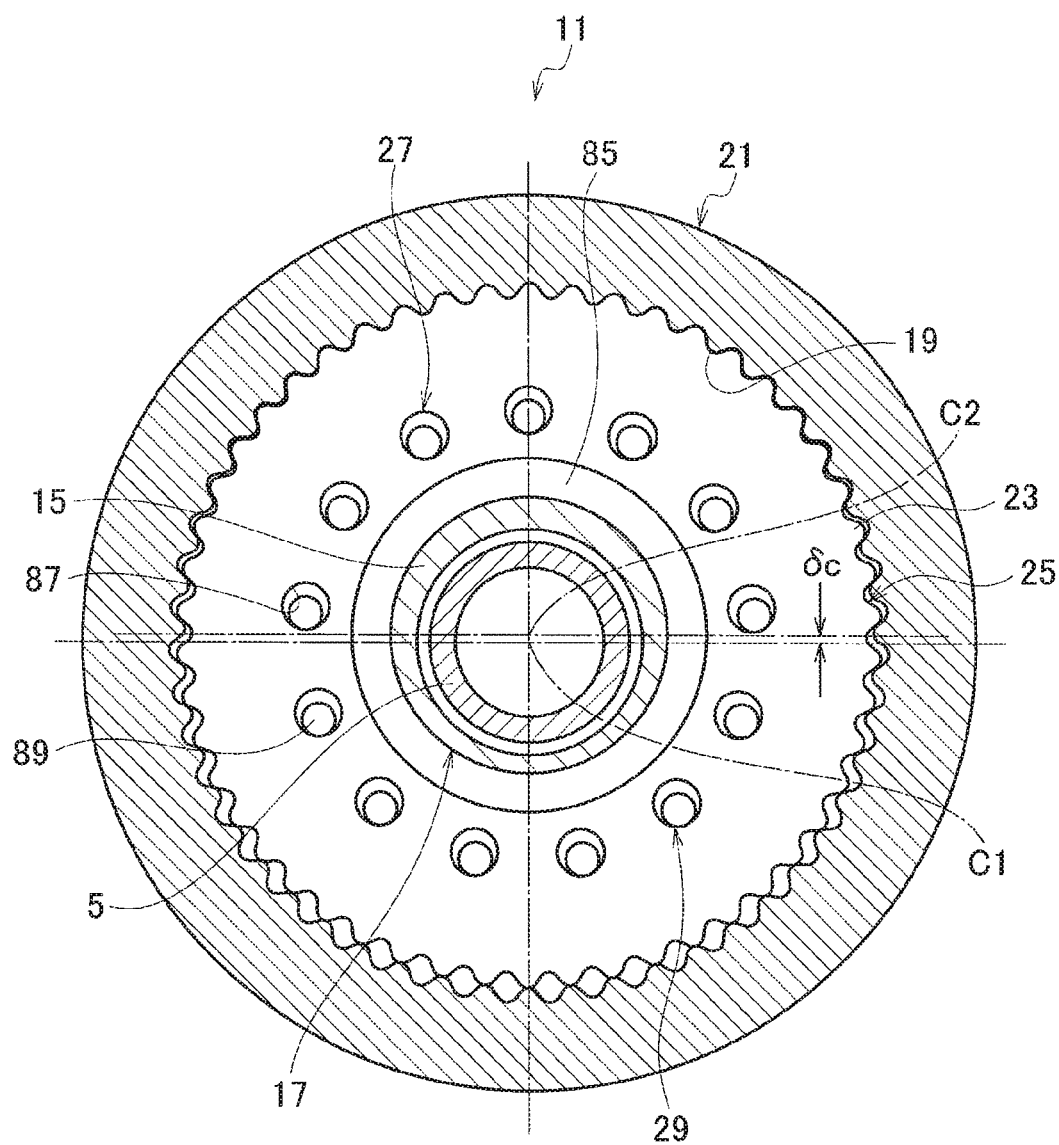
FIG. 2 is a sectional side view taken from the line II-II of FIG. 1.

Details of the respective elements in the reduction mechanism 11 will be described hereinafter with reference to FIG. 2 in combination with FIG. 1.

The input member 17 has a structure similar to a cylinder, and is combined with the rotor 65 and rotatable about the axis C1. To set this in a rotatable condition, preferably a bearing 81 and a bearing 83 support the input member 17. The bearing 83 may be supported by the motor housing 67 and the bearing 81 may be supported by the cover body 73.

The input member 17 is, around the part combined with the rotor 65, a cylinder that is rotationally symmetrical about the axis C1, and is extended therefrom toward the clutch 7. This extended part is an eccentric shaft 15 that is eccentric relative to the axis C1. While C2 in FIGS. 1 and 2 depicts a central axis of the eccentric shaft 15, the axis C2 deviates from the axis C1 at a deviation δc. When the input member 17 rotates about the axis C1, the eccentric shaft 15 and the axis C2 make eccentric motions about the axis C1.

The fixed member 21 has a pan-like structure that is rotationally symmetrical about the axis C1, and can be fixed to the motor 9 and immovable about the axis C1. For fixation, one or more bolts 71 penetrating the motor housing 67 and tightened into the fixed member 21 may be used. This structure enables a production process of producing the motor 9 in advance, subsequently combining the reduction mechanism 11 with the motor 9 by means of the bolts 71, and next combining the whole of them with the clutch 7.

The fixed member 21, on its internal periphery, has a structure for meshing with the intermediate member 25, an example of which is an internally toothed gear 19.

The intermediate member 25 has a structure similar to a disk and at its center fits around the eccentric shaft 15 to make an eccentric motion together. Between the intermediate member 25 and the eccentric shaft 15 a bearing 85 is interposed, for example, the member 25 and shaft 15 thereby being rotatable relative to each other.

The intermediate member 25, at its external periphery, has a structure for meshing with the fixed member 21, an example of which is an externally toothed gear 23. As the intermediate member 25 meshes with the fixed member 21 and also makes an eccentric motion along with the eccentric shaft 15, it can create a rotary motion about the axis C2. As the rotary motion would not be created if the teeth number of the internally toothed gear 19 was the same as the teeth number of the externally toothed gear 23, these have different numbers of teeth. For example, the teeth number of the internally toothed gear 19 can be greater by one or more than the teeth number of the externally toothed gear 23.

The tooth shape of the internally toothed gear 19 and the externally toothed gear 23 can have any of an involute tooth form, a cycloid tooth form, a circular arc tooth form, and an epitrochoid tooth form.

The output member 29 also has a structure similar to a cylinder and is, on its outer periphery for example, rotatably supported by the fixed member 21. This support may be either by mutual sliding contact or by interposing a bearing. This output member 29 at one end thereof engages with the intermediate member 25.

For engagement, the intermediate member 25 and the output member 29 have an engaging portion 27. The engaging portion 27 consists of a plurality of engaging holes 87 opened on the intermediate member 25 along a circle around the axis C2, and a plurality of engaging pins 89 projecting from the output member 29 corresponding thereto. The engaging holes 87 may be bottomed holes or through-holes. In order to absorb a difference between respective rotation centers thereof, the respective engaging holes 87 are formed larger than the respective engaging pins 89. In order to reduce friction between the engaging holes 87 and the engaging pins 89, sliding bushes or bearings may be interposed therebetween. On the basis of such engagement, the output member 29 follows the intermediate member 25 to rotate about the axis C1.

The output member 29, at the end opposite to the engaging pins 89 and on its outer periphery, may be comprised of a structure, such as splines 91 for example, for engaging with a cam follower 93, described below.

The cam mechanism 13 intervenes between the output member 29 and the clutch 7. The cam mechanism 13 in general includes a cam disk 90 and the cam follower 93, and may have an intervening member such as a cam ball 95 interposed therebetween. The cam follower 93 is comprised of a pressure face 97 for pressing the clutch 7. The cam mechanism 13 converts the rotary motion of the output member 29 into a motion in the axial direction, so that the pressure face 97 presses the clutch 7.

Figure 3A:
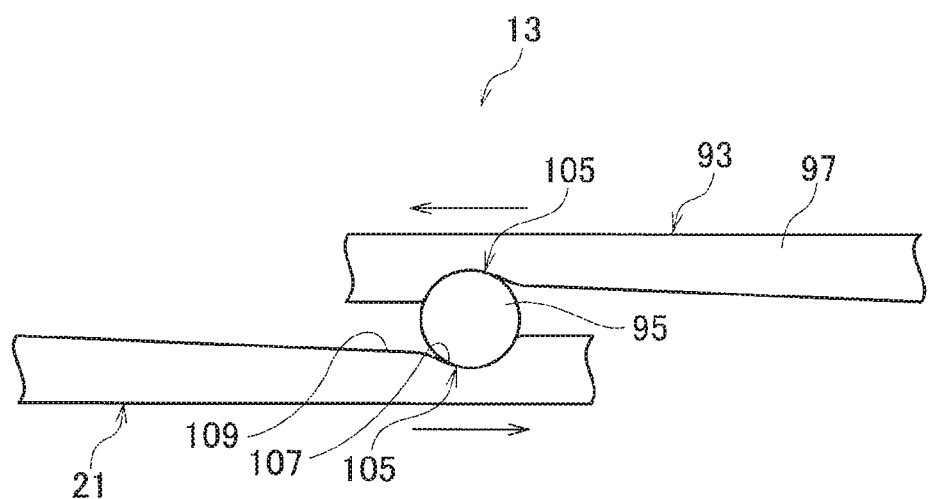
FIG. 3A is a schematic drawing where a cam mechanism is developed upon a face along its circumferential direction.
Figure 3B:
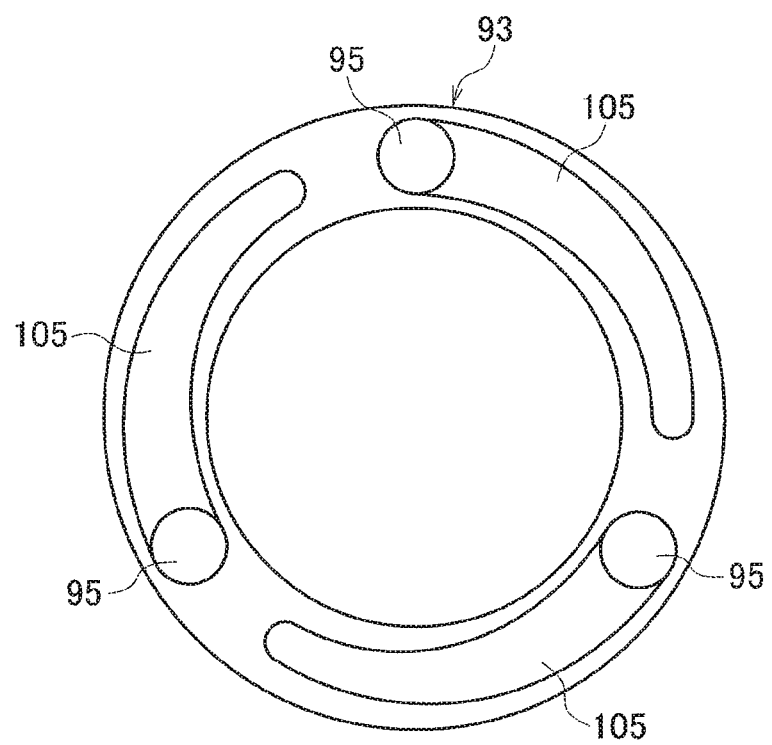
FIG. 3B is a side view of the cam mechanism seen in the axial direction.

Referring to FIG. 3A and FIG. 3C, the cam disk 90 and the cam follower 93 are circular members opposed to each other. One or both of them have a plurality of cam faces 105 sloping toward these circumferential directions so as to get shallower. When the cam disk 90 rotates, the irrotational cam follower 93 is pressed out along the sloping faces of the cam faces 105, thereby converting the rotary motion into the axial motion. In order to make the force acting on the cam mechanism 13 axially symmetrical, the cam faces 105 preferably exhibit rotational symmetry about the axis C1.

Each cam face 105 may consist of a first slope 107 that is relatively steep and a second slope 109 that is relatively gradual. Such a structure makes a ratio (stroke ratio) of a distance by the axial motion to a distance by the rotary motion be a profile such as one described below.

In an initial state, the cam ball 95 rests on a bottom of the first slope 107. When the output member 29 transmits its rotation to the cam mechanism 13, the cam ball 95 initially goes up the steep first slope 107 and therefore the cam follower 93 makes an axial motion with a relatively large stroke ratio. This construction creates relatively small pressure force but rapidly shifts the pressure face 97 toward the clutch 7. As great pressure force is unnecessary until the pressure face 97 butts against the clutch 7, this is preferable in this stage. The cam ball 95 next goes up the gradual second slope 109 and therefore the cam follower 93 makes an axial motion with a relatively small stroke ratio. This construction creates relatively large pressure force and is preferable in the stage where relatively large pressure force is required just after the pressure face 97 butts against the clutch 7.

Referring again to FIG. 1, the cam disk 90 is fixed to, or forms a unitary body with, the fixed member 21. The cam follower 93 engages with, and rotates along with, the output member 29, but is slidable in the axial direction. As described above, when the cam follower 93 is made to rotate by the output member 29, the rotation makes the cam follower 93 shift in the axial direction, and the pressure face 94 therefore presses the clutch 7. A pressure body 99 may intervene between the pressure face 97 and the clutch 7, and further a thrust bearing 101 may intervene therebetween for the purpose of allowing relative rotation. To return the cam follower 93 to the initial position, a return spring 103 may intervene between the clutch 7 and the pressure face 97 or the pressure body 99.

Figure 8:
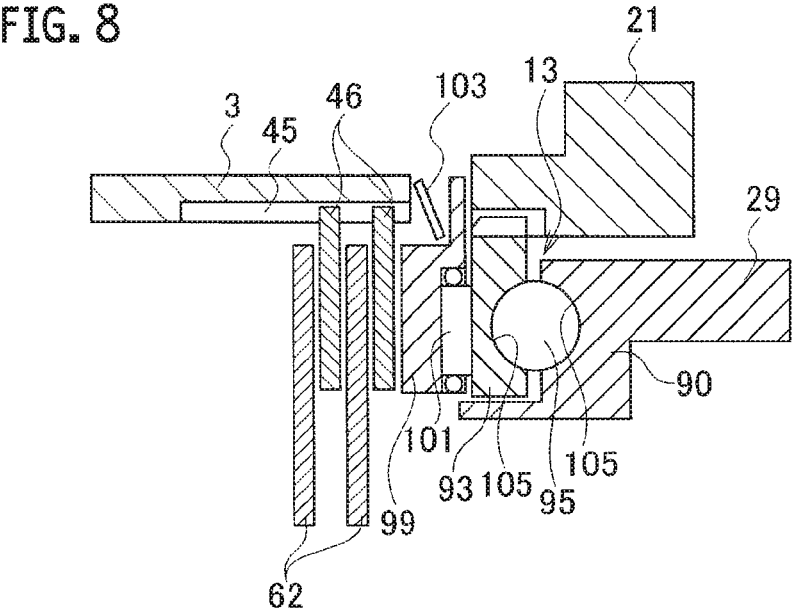
FIG. 8 is a sectional elevational view of a cam mechanism according to a modified example.

As an alternative to the aforementioned structure, the cam disk 90 may be fixed to, or unitary with, the output member 29 as shown in FIG. 8. The cam follower 93 may correspondingly engage with the fixed member 21, thereby being movable in the direction along the axis C1 but immovable around the axis C1. When the cam disk 90 is forced to rotate by the output member 29, the rotation makes the cam follower 93 shift in the axial direction, and the pressure face 97 therefore presses the clutch 7.

The casing 6 has a structure similar to a cylinder and both of its ends are, as described above, opened in the axial direction. The first opening allows access to the clutch drum 3 and the second opening allows access to the clutch hub 5. The casing 6, when fixed by means of bolts 8, constitutes a part of a casing 35 belonging to the vehicle body and is immovable around the axis C1. As the motor 9 is relatively heavy among constituent elements and is close to the second opening fixed by the bolts 8, this structure provides stiff support, thereby being advantageous in prevention of vibration.

The transmission device 1 further has some structures for shielding the interior of the casing 6 from the exterior. For example, the clutch drum 3 may have a wall for blocking its interior. For the convenience of injecting lubrication oil therein, this wall may have a through-hole 41. After injection, preferably a check ball 43 is pressed into and thus closes the through-hole 41. The clutch hub 5 may similarly have a partitioning wall 53 for blocking the interior.

Between the clutch drum 3 and the casing 6, a seal member 37 may be interposed so as to abut both of them, thereby closing a gap therebetween. A dust cover 39 can cover the seal member 37. Between the clutch hub 5 and the motor housing 67, a seal member 57 may be interposed so as to abut both of them. Further, a seal member 75 such as an O-ring may be interposed between the motor housing 67 and the casing 6. Still further, a seal member 77 such as an O-ring may be interposed between the motor housing 67 and the cover body 73.

In accordance with the structure as described above, any foreign matter from the exterior does not intrude into the transmission device 1. Further the lubrication oil in the interior does not leak out and is prevented from mixing with any lubrication oil at the exterior. The transmission device 1 can be handled independently from the exterior structure.

Further, the transmission device 1 has a structure for promoting circulation of the lubrication oil within the casing 6. The clutch hub 5 may be comprised of a plurality of lubrication holes 55 penetrating the hub 5 in radial directions. The clutch hub 5 is, being coupled with the rear differential 219, driven by the rear wheels 223 to steadily rotate as long as the vehicle is running. Centrifugal force by the rotation forces the lubrication oil out through the lubrication holes 55 and then the respective parts of the transmission device 1 are lubricated.

While the description above has been given to the example where the clutch drum 3 is coupled with the propeller shaft 217 and the clutch hub 5 is coupled with rear differential 219, a converse relation may be possible. Alternatively, the transmission device 1 may be usable for interrupting power transmission between the other shafts.

According to the present example, as the intermediate member 25 meshes with the fixed member 21 and as well makes an eccentric motion along with the eccentric shaft 15 to use the created rotary motion for reducing the rotation speed, a very great reduction ratio can be realized. In a case where the engagement between the intermediate member 25 and the fixed member 21 is established by the internally toothed gear 19 and the externally toothed gear 23, which have distinct teeth numbers, the reduction ratio is determined by these teeth numbers and the difference therebetween. For example, in a case where the teeth number of the internally toothed gear 19 is 50 and the teeth number of the externally toothed gear 23 is 49, while the motor 9 rotates one revolution, the output member 29 merely rotates one-fifteenth revolution. As the reduction ratio is far greater than in the prior art, the output of the motor 9 is multiplied to the far greater extent and then converted into the pressure force in the axial direction by means of the cam mechanism 13. The transmission device 1 of the present example can therefore connect the clutch 7 with relatively great force even with a low-capacity motor 9. Further, the example can, as using the gradually sloping cam face to create the pressure force, gradually increase or decrease the pressure force. More specifically, the present example has an excellent controllability and therefore readily realizes the operation to control torque distribution to the rear wheels.

Further, in accordance with the present example, a complex gear mechanism is unnecessary to obtain a great reduction ratio. Therefore it allows size reduction of the structure particularly in its axial direction. It is unnecessary to use a wide space in the vehicle for installing the transmission device 1 therein. Further, as the weight gain is relatively small, it is advantageous in reducing fuel consumption.

Moreover, as the interior of the casing 6 is shielded from the exterior, the transmission device 1 of the present example provides easy handleability.

While the description above has been given to the example where the transmission device 1 is at the stage subsequent to the propeller shaft 217, of course the power takeoff 213 may be interposed between a shaft led out of the transmission and the propeller shaft 217 so as to control torque transmission therebetween. Alternatively, it may be interposed between any wheel and an axle so as to control torque transmission therebetween. Further, it may be used in an on-demand transfer at a part where a main drive path and a sub drive path branch off, so as to control torque transmission therebetween.

Further, to obtain higher reduction ratio, two stages of reduction mechanisms 11 may be connected in series.

Although certain examples have been described above, modifications and variations of the examples described above will occur to those skilled in the art, in light of the above teachings.

The invention claimed is:

1. A transmission device for interruptibly transmitting torque between a first rotary member and a second rotary member, each rotatable about an axis, the transmission device comprising:
    a clutch disconnectably and drivingly coupling the first rotary member with the second rotary member;
    a motor including a rotor rotatable about the axis;
    an input member coupled with the rotor and rotatable about the axis, the input member including an eccentric shaft eccentric relative to the axis;
    a fixed member immovable about the axis;
    an intermediate member fitting with the eccentric shaft to make an eccentric motion and meshing with the fixed member to make a rotary motion about the eccentric shaft;
    an output member rotatable about the axis and fitting with and following the intermediate member; and
    a cam mechanism intervening between the output member and the clutch to convert a rotary motion of the output member into a motion in a direction along the axis to press the clutch.

2. The transmission device of claim 1, wherein the fixed member comprises an internally toothed gear having a first teeth number and the intermediate member comprises an externally toothed gear meshing with the internally toothed gear and having a second teeth number smaller in number than the first teeth number, whereby the intermediate member meshes with the fixed member.

3. The transmission device of claim 1, wherein the cam mechanism includes:
    a cam disk coupled with or forming a unitary body with a member selected from the group consisting of the fixed member and the output member; and
    a cam follower engaging so as to be movable in the direction along the axis with another member selected from the group consisting of the fixed member and the output member, and driven by the cam disk to make a motion in the direction along the axis to press the clutch.

4. The transmission device of claim 1, wherein the clutch includes a clutch drum combinable with the first rotary member and a clutch hub combinable with the second rotary member and disposed at least partly inside the clutch drum.

5. The transmission device of claim 4, wherein the clutch drum and the input member rotatably support the clutch hub.

6. The transmission device of claim 4, wherein the fixed member rotatably supports the clutch drum.

7. The transmission device of claim 4, further comprising:
    a casing that houses at least the clutch and the motor, and that has a first opening opened in the direction along the axis to allow access to the clutch drum and a second opening opened in the direction along the axis to allow access to the clutch hub,
    wherein the motor is disposed so as to be exposed to the second opening.

* * * * *